(12) United States Patent
An et al.

(10) Patent No.: US 11,361,459 B2
(45) Date of Patent: Jun. 14, 2022

(54) METHOD, DEVICE AND NON-TRANSITORY COMPUTER STORAGE MEDIUM FOR PROCESSING IMAGE

(71) Applicant: BEIJING DAJIA INTERNET INFORMATION TECHNOLOGY CO., LTD., Beijing (CN)

(72) Inventors: Shijie An, Beijing (CN); Yuan Zhang, Beijing (CN); Chongyang Ma, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/906,777

(22) Filed: Jun. 19, 2020

(65) Prior Publication Data
US 2020/0320726 A1    Oct. 8, 2020

(30) Foreign Application Priority Data
Jun. 21, 2019   (CN) .......................... 201910543889.0

(51) Int. Cl.
*G06T 7/55*       (2017.01)
*G06T 7/11*       (2017.01)
(Continued)

(52) U.S. Cl.
CPC .................. *G06T 7/55* (2017.01); *G06T 7/11* (2017.01); *G06T 7/194* (2017.01); *G06T 7/136* (2017.01);
(Continued)

(58) Field of Classification Search
CPC .......................... G06T 7/55; G06T 7/11; G06T 2207/10028; G06T 2207/20076; G06T 2207/20221;
(Continued)

(56) References Cited

U.S. PATENT DOCUMENTS

| 2007/0036427 | A1* | 2/2007 | Nakamura | ......... G02B 27/0075 |
| | | | | 382/154 |
| 2015/0003740 | A1* | 1/2015 | Kano | ...................... G06T 5/002 |
| | | | | 382/195 |
| 2018/0068430 | A1* | 3/2018 | Sang | ....................... G06F 17/18 |

FOREIGN PATENT DOCUMENTS

| CN | 104102068 A | * 10/2014 |
| CN | 104102068 A |   10/2014 |
| CN | 106412433 A |    2/2017 |

(Continued)

OTHER PUBLICATIONS

Shuifa Sun, ImageJ Image Processing and Practice, ISBN No. 978-7-118-09175-5, National Defense Industry Press, p. 227, Dec. 2013 (Year: 2013).*
Shuifa Sun, ImageJ Image Processing and Practice, ISBN No. 978-7-118-09175-5, National Defense Industry Press, p. 227, Dec. 2013.

(Continued)

*Primary Examiner* — Nay A Maung
*Assistant Examiner* — Daniella M. DiGuglielmo
(74) *Attorney, Agent, or Firm* — Meunier Carlin & Curfman LLC

(57) ABSTRACT

The present disclosure provides a method, device and non-transitory computer storage medium for processing an image. The method includes: obtaining an image by a monocular camera; extracting image features with different levels based on the image; determining a fused feature by fusing the image features with different levels; and determining a depth distribution feature map of the image based on the fused feature, where a pixel value of each pixel point in the depth distribution feature map is a depth value.

13 Claims, 12 Drawing Sheets

(51) Int. Cl.
*G06T 7/194* (2017.01)
*G06T 7/50* (2017.01)
*G06T 7/136* (2017.01)

(52) U.S. Cl.
CPC ...... *G06T 7/50* (2017.01); *G06T 2207/10028* (2013.01); *G06T 2207/20076* (2013.01); *G06T 2207/20081* (2013.01); *G06T 2207/20084* (2013.01); *G06T 2207/20221* (2013.01)

(58) Field of Classification Search
CPC ........... G06T 2207/20081; G06T 2207/20084; G06T 7/50; G06T 7/136; G06T 7/194
USPC ........................................................ 382/100
See application file for complete search history.

(56) References Cited

FOREIGN PATENT DOCUMENTS

| | | | | |
|---|---|---|---|---|
| CN | 107578436 | A | * | 1/2018 |
| CN | 107578436 | A | | 1/2018 |
| CN | 109410261 | A | * | 3/2019 |
| CN | 109410261 | A | | 3/2019 |
| CN | 109889724 | A | * | 6/2019 |
| CN | 109889724 | A | | 6/2019 |

OTHER PUBLICATIONS

Shiyu Zhao, Super-Resolution for Monocular Depth Estimation with Multi-Scale Sub-Pixel Convolutions and a Smoothness Constraint, Feb. 12, 2019, China.

* cited by examiner

11-A    11-B    11-C

METHOD, DEVICE AND NON-TRANSITORY COMPUTER STORAGE MEDIUM FOR PROCESSING IMAGE

CROSS-REFERENCE TO RELATED APPLICATION

This application is based on and claims priority under 35 U.S.C 119 to Chinese Patent Application No. 201910543889.0, filed on Jun. 21, 2019, in the China National Intellectual Property Administration. The entire disclosure of the above application is incorporated herein by reference.

FIELD

The present disclosure relates to the field of image processing, in particular to a method, device and non-transitory computer storage medium for processing an image.

BACKGROUND

With continuous development of social trends, people's aesthetic consciousness changes constantly, more and more people want to obtain images satisfying personal needs through image acquisition devices.

SUMMARY

The present disclosure provides a method, device and non-transitory computer storage medium for processing an image, which are used for at least solving the problem of poor accuracy of image depth estimation in the related art.

In a first aspect, an embodiment of the present disclosure provides a method for processing an image. The method includes: obtaining an image by a monocular camera; extracting image features with different levels based on the image; obtaining a fused feature by fusing the image features with different levels; and obtaining a depth distribution feature map of the image based on the fused feature. A pixel value of each pixel point in the depth distribution feature map is a depth value.

In some embodiments, the determining the fused feature includes: obtaining a super-high-level image feature by convoluting the image feature at the highest level in the image features with different levels through convolution kernels in multiple sizes; determining the fused feature by fusing the image features and the super-high-level image feature.

In some embodiments, the determining the fused feature by fusing the image feature and the super-high-level image feature includes: fusing the image features in order of levels of the image features from highest to lowest, and number of output channels is sequentially reduced. The super-high-level image feature and the image feature with highest level are fused firstly. The image features are fused based on a result of the previous said fusing the image features, and the image feature with a corresponding level.

Times of said fusing the image features are less than or equal to a total number of the different levels, and a resolution of the fused feature is the same as a resolution of the image.

In some embodiments, the method further includes: determining the depth distribution feature map with one channel based on the fused feature, where the fused feature includes at least two channels.

In some embodiments, the method further includes: obtaining a first depth value of a selected focusing point and a second depth value of a pixel point to be blurred from the depth distribution feature map; determining an absolute difference between the first depth value and the second depth value; determining a blurred radius based on the absolute difference, where the blurred radius is positively correlated with the absolute difference; determining a blurred kernel based on the blurred radius and a pre-selected convolution kernel; and blurring respective pixel points in an area of the depth distribution feature map based on the blurred kernel, where the area is an area with the pixel point to be blurred as a reference and the blurred radius as a radius.

In some embodiments, the acquiring the selected focusing point includes: obtaining image blocks by segmenting the image based on a size of a focusing frame, and determining depth statistical values of the pixel points of each image block; determining a first value range of a focusing frame area based on the depth statistical values; receiving a first operation instruction of the focusing frame area, where the first operation instruction includes values of the focusing frame area; and selecting a specified image block as the focusing frame area based on the first operation instruction, where the depth statistical values in the specified image block are equal to the values of the focusing frame area in the first operation instruction, and the focusing frame area represents a position of the selected focusing point.

In some embodiments, the determining the blurred radius further includes: receiving a second operation instruction for the blurred radius, where the second operation instruction includes an aperture value; and determining the blurred radius based on the aperture value and the determined blurred radius.

In a second aspect, an embodiment of the present disclosure provides a device for processing an image. The device includes a memory and at least one processor.

The at least one processor is configured to read and execute instructions stored in the memory to: obtain an image by a monocular camera; extract image features with different levels based on the image; determine a fused feature by fusing the image features with different levels; and determine a depth distribution feature map of the image based on the fused feature, where a pixel value of each pixel point in the depth distribution feature map is a depth value.

In some embodiments, the at least one processor is further configured to read and execute instructions stored in the memory to: determine a super-high-level image feature by convoluting the image feature at the highest level through convolution kernels in multiple sizes; and determine the fused feature by fusing the image features and the super-high-level image feature.

In some embodiments, the at least one processor is further configured to read and execute instructions stored in the memory to: fuse the image features in order of the levels of the image features from highest to lowest; fuse the super-high-level image feature and the image feature with highest level firstly; and fuse the image features based on a result of the previous said fusing the image features, and the image feature with a corresponding level; where times of said fusing the image features are smaller than or equal to a total number of the different levels, and a resolution of the fused feature is the same as a resolution of the image.

In some embodiments, the at least one processor is further configured to read and execute instructions stored in the memory to: determine the depth distribution feature map with one channel based on the fused feature, where the fused feature includes at least two channels.

In some embodiments, the at least one processor is further configured to read and execute instructions stored in the memory to: obtain a first depth value of a selected focusing point and a second depth value of a pixel point to be blurred of the depth distribution feature map; determine an absolute difference between the first depth value and the second depth value; determine a blurred radius based on the absolute difference; where the blurred radius is positively correlated with the absolute difference; determine a blurred kernel based on the blurred radius and a pre-selected convolution kernel; and blur respective pixel points in an area of the depth distribution feature map based on the blurred kernel, where the area is an area with the pixel point to be blurred as a reference and the blurred radius as a radius.

In some embodiments, the at least one processor is further configured to read and execute instructions stored in the memory to: obtain image blocks by segmenting the image based on a size of a focusing frame; determine depth statistical values of pixel points of each image block; determine a first value range of a focusing frame area based on the depth statistical values; receive a first operation instruction of the focusing frame area, where the first operation instruction includes values of the focusing frame area; and select a specified image block as the focusing frame area based on the first operation instruction, where the depth statistical values in the specified image block are equal to the values of the focusing frame area in the first operation instruction, and the focusing frame area represents a position of the selected focusing point.

In some embodiments, the at least one processor is further configured to read and execute instructions stored in the memory to: receive a second operation instruction for the blurred radius, where the second operation instruction includes an aperture value; and determine the blurred radius based on the aperture value and the determined blurred radius.

In some embodiments, convolution kernels are in at least two of following shapes: heart shape, pentagram, circle, pentagon, and butterfly shape.

In a third aspect, an embodiment of the present disclosure provides a non-transitory computer storage medium, storing computer executable instructions, where the computer executable instructions are configured to: obtain an image by a monocular camera; extract image features with different levels based on the image; determine a fused feature by fusing the image features with different levels; and determine a depth distribution feature map of the image based on the fused feature, where a pixel value of each pixel point in the depth distribution feature map is a depth value.

BRIEF DESCRIPTION OF THE DRAWINGS

The accompanying drawings, which are incorporated in and constitute a part of the specification, illustrate embodiments consistent with the present disclosure and, together with the specification, serve to explain the principles of the present disclosure and are not to be construed as unduly limiting the present disclosure.

DETAILED DESCRIPTION OF THE EMBODIMENTS

Figure 1:
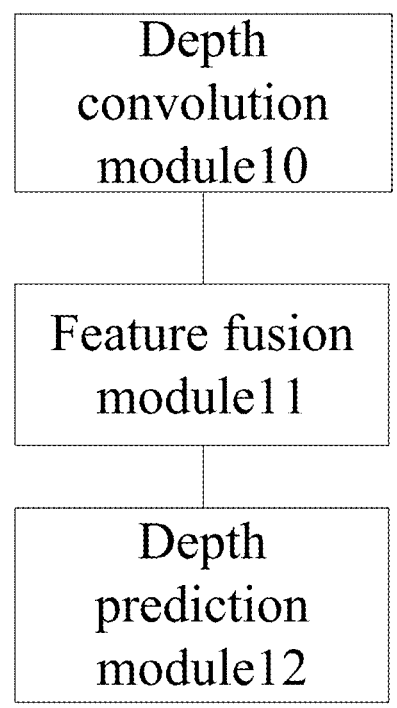
FIG. 1 is a structure diagram of a depth detection network model provided by an embodiment of the present disclosure.

In order to provide those of ordinary skill in the art with a better understanding of the present disclosure, the schemes in the embodiments of the present disclosure will be clearly and completely described below with reference to the accompanying drawings.

It should be noted that the terms 'first', 'second' and the like in the specification and claims of the present disclosure and in the foregoing drawings are used for distinguishing between similar objects and not necessarily for describing a particular order or sequential order.

It is to be understood that such descriptions are interchangeable under appropriate circumstances so that embodiments of the present disclosure are capable of operation in sequences other than those illustrated or described herein. The embodiments described in the following exemplary embodiments do not represent all embodiments consistent with the present disclosure. Rather, they are merely examples of devices and methods consistent with certain aspects of the present disclosure as detailed in the appended claims.

The present disclosure provides a depth detection network model. The network model is a depth learning network model capable of automatically learning depth-related features in the two-dimensional image, such as perspective and texture information, object size, object position and occlusion, so as to solve the foregoing ill-posed problem.

In some embodiments of the present disclosure, a depth distribution feature map is depth value. As the name implies, a pixel value of each pixel point in the depth distribution feature map is a depth value, so that each pixel point in the original two-dimensional image can find the corresponding depth value in the depth distribution feature map.

In some embodiments, in order to facilitate processing, the depth distribution feature map can refer to a thermodynamic diagram or a gray-scale map and the like corresponding to depth data of the image, so long as different depths can be expressed, both the thermodynamic diagram and the gray-scale map are suitable for the embodiments of the present disclosure.

After understanding the meaning of the depth distribution feature map, the depth detection network model described above is further described below in order to facilitate an understanding of how to determine the depth of an image captured by the monocular camera in the present disclosure.

Training samples of the network model are based on the image acquired by the monocular camera, and are obtained by taking the depth distribution feature map of each pixel point in the image as a label of the training samples. After being trained through the training samples, the network model can extract image features with different levels from the image, the image features include image features at the various levels from the lowest level to the highest level, and then image features which not only include low-level features, but also include high-level features are obtained by fusing the image features with different levels. In a prediction stage, the network model can obtain the depth distribution feature map of the image by processing the fused image features. Due to the fact that each pixel point in the image has a corresponding depth value in the depth distribution feature map, compared with a segmentation-based method, the method for processing an image provided by the present disclosure can predict the depths of the different pixels in the image rather than simple binary classification as foreground and background. Compared with the binocular-vision-based depth estimation method, the method for processing an image has the advantages that expensive camera equipment is not required, the hardware cost is saved, and the image depth does not need to be estimated through a stereo geometry method, so that the calculating amount is reduced.

In some embodiments, the training samples of the network model are obtained by processing the training samples through image processing operation. The image processing operation includes at least one of the following operations: image contrast adjustment, image rotation, image random cropping and image pixel disturbance. For example, modes of increasing or decreasing the contrast of the image, rotating the image left and right, and the like are implemented. Through the modes, the number of the training samples is increased, furthermore, the degree that the model is interfered by external factors is reduced, and for example, adjustment of contrast has a good depth prediction effect on images with low illumination and low contrast. By image rotation, random image cropping and the like, the training samples can cover some simple deformed samples of the image, so that the trained network model is suitable for the samples with simple deformation.

In some embodiments, in order to facilitate construction of the training samples and subsequent training of the network model, since the depth distribution features of the training samples of different shooting scenes are inconsistent, at least two types of training sample subsets of the different scenes can be included in the training samples in order to enable the network model to be suitable for the different scenes.

In order to facilitate construction of the training samples, the number of the samples in the training sample subsets for the different scenes in the present disclosure may be different. In this case, by setting weight values of the training samples for the different scenes, it can be ensured that pictures, input into the network model, of the various scenes during training of the network model are balanced to prevent deviation during training of the network model. That is, in the process of training the depth detection network model, the training samples can be obtained from the training sample subsets of the various scenes according to the sampling weights of the different scenes for training, wherein the sampling weights of the scenes with more samples are lower than the sampling weights of the scenes with less samples. In one embodiment, the sampling weights of the training samples of each scene are calculated by dividing the total number of the samples by the training samples for the scene, wherein the greater the number of the training samples for the scene, the smaller the sampling weight, and the smaller the number of the training samples for the scene, the greater the sampling weight, and thus, the number of the training samples, input to the network model, of the various scenes is balanced.

Of course, in addition to the above method for determining the weights, the sampling weights of the different scenes can be configured according to training results and empirical values generated in the training process, so long as a purpose of balanced learning of the training samples in the various scenes can be achieved.

In some embodiments, the depth feature distribution map in the sample label can be obtained by performing depth estimation on the training samples by using the binocular camera; laser radar can also be used for acquiring the depth values of various pixel points in the training samples. In specific implementation, the depth distribution feature map corresponding to the training samples can be determined according to actual requirements, and is applicable to the present disclosure.

After the training samples adopted by the present disclosure and basic principles of a predicting depth are introduced, the network model structure provided by embodiments of the present disclosure is further described with reference to the accompanying drawings.

As shown in FIG. 1, the network model includes a depth convolution module 10, a feature fusion module 11 and a depth prediction module 12.

The depth convolution module 10 is configured to extract the image features with different levels of the image.

The image features with different levels include image features at multiple levels of the image from a lower level to a higher level.

The feature fusion module 11 is configured to obtain a fused feature by fusing the image features extracted by the depth convolution module 10.

The depth prediction module 12 is configured to obtain the depth distribution feature map of the image by processing the fused feature. A pixel value of each pixel point in the depth distribution feature map is a depth value.

As previously stated, processing the image through the network model in the embodiments of the present disclosure can not only predict the image depth of the different pixels in the two-dimensional image to obtain an image depth with rich levels, but also reduce the requirement on the hardware equipment and reduce the calculation amount. Due to the fact that the calculating amount is reduced and the requirement of hardware equipment is not high, the method is suitable for real-time image processing.

The following description focuses on various modules included in the network model of the present disclosure.

1. Depth Convolution Module 10.

In some embodiments, in order to increase a processing speed, the image is processed by adopting the lightweight network model, and the depth convolution module includes at least two depth separable convolution units which are sequentially connected in series, where the numbers of output channels of the different depth separable convolution units are different, the number of output channels of each depth separable convolution unit is larger than the number of input channels, and the numbers of output channels of the depth separable convolution units are sequentially increased according to a series sequence of the depth separable convolution units.

Each depth separable convolution unit includes a network layer of a depth separable convolution structure and a down-sampling layer connected with the network layer in series. The network layer is configured to obtain the image features at the corresponding level by extracting features of input information. The down-sampling layer is configured to down-sample the image features at the corresponding level.

Figure 2:
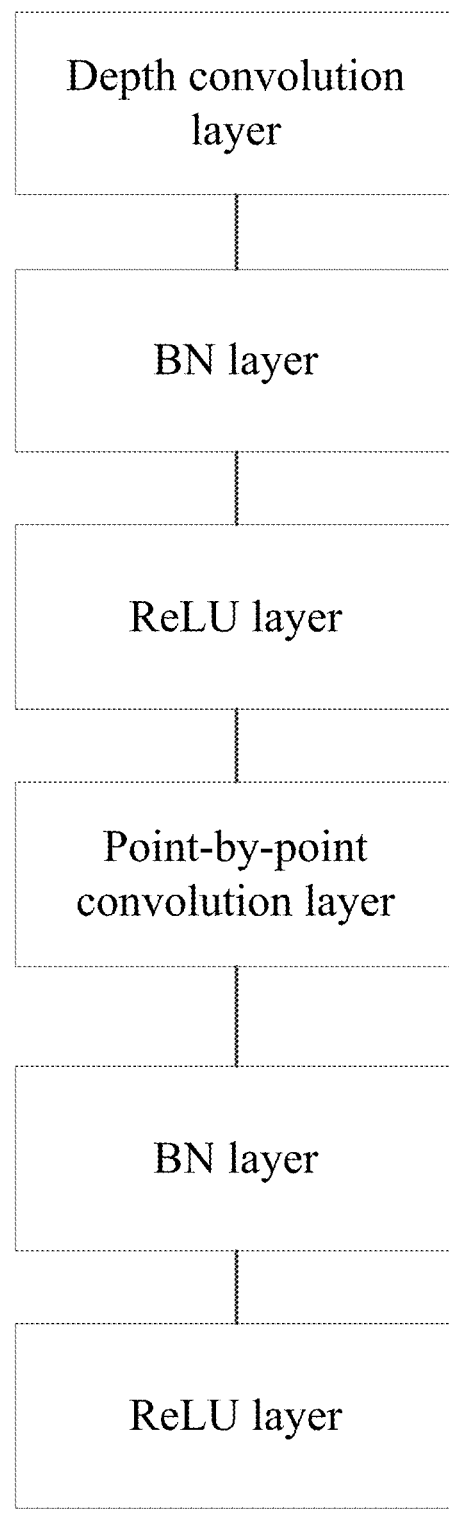
FIG. 2 is a schematic diagram of a depth separable convolution structure provided by an embodiment of the present disclosure.

As shown in FIG. 2, the depth separable convolution structures include depth convolution structures and point-by-point convolution structures. The depth convolution structures and the point-by-point convolution structures are connected in series. Each depth convolution structure includes a depth convolution layer, a batch normalization (BN) layer, and a rectified linear unit (ReLU) layer. Each point-by-point convolution structure includes a point-by-point convolution layer, a BN layer and an ReLU layer. As the point-by-point convolution structures are applied to the depth separable convolution structures, the calculating amount is reduced when a depth separable convolution unit extracts features.

Each depth separable convolution unit adopts the corresponding depth separable convolution structure, so that the calculating amount during feature extraction is reduced, and the features of the image are subjected to down-sampling processing through the down-sampling layers, the processing data amount of subsequent operations can be reduced, the main features can be reserved, and thus, the processing speed is increased.

2. Feature Fusion Module 11 and Pyramid Module.

In some embodiments, in order to fuse the image features with different levels, the feature fusion module includes at least two second fusion convolution units which are sequentially connected in series. The total number of the second fusion convolution units is smaller than or equal to the total number of the levels of image features output by the depth convolution module. The number of input channels of each second fusion convolution unit is larger than the number of output channels of the each second fusion convolution unit. The number of the output channels of the each second fusion convolution unit is sequentially reduced according to the serial connection sequence of the second fusion convolution units.

By adopting the feature fusion module with said structure, the second fusion convolution units are sequentially connected in series, the number of the input channels is greater than the number of the output channels, and thus, the image features at the high level and the image features at the low level of a depth separable convolution unit can be fused effectively.

Figure 3:
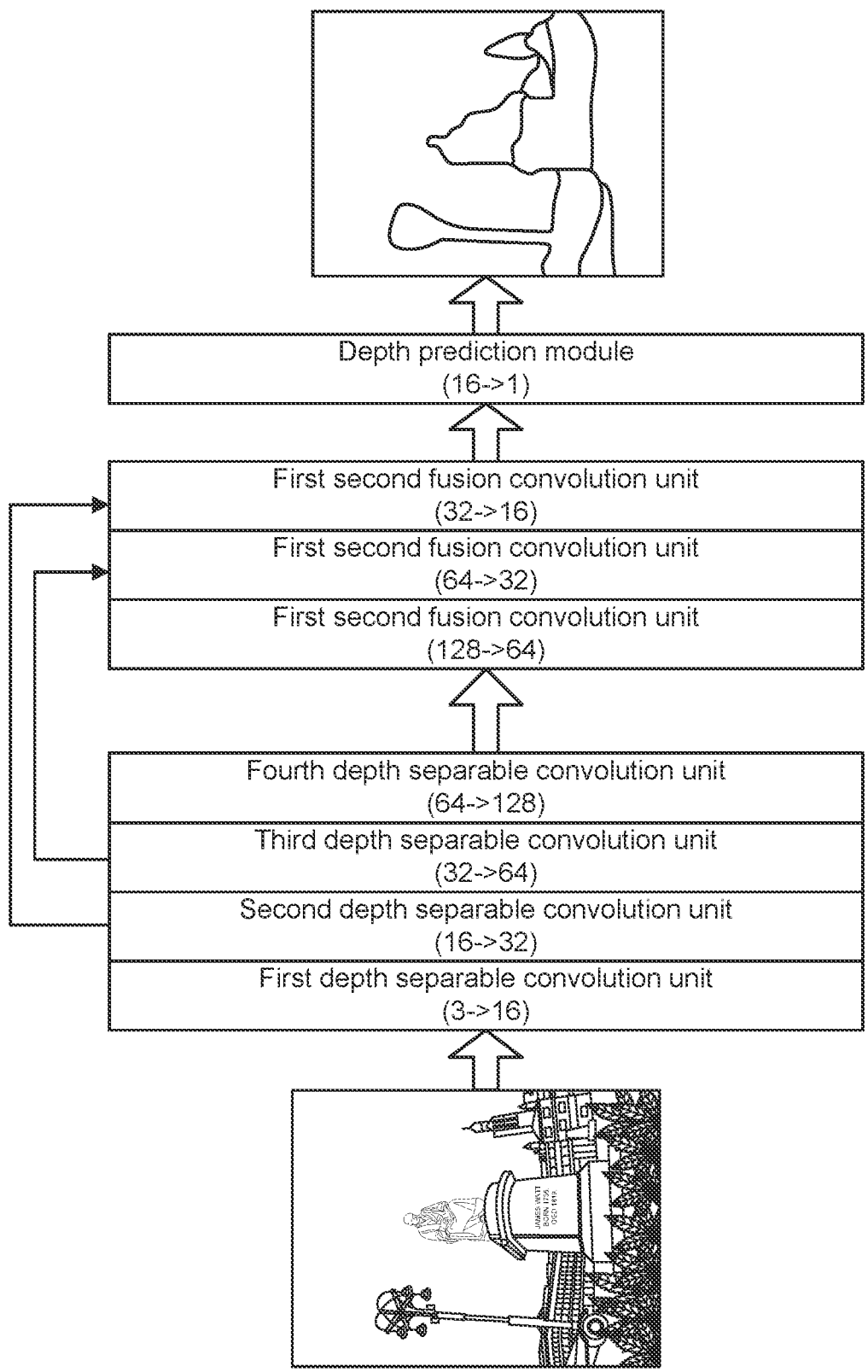
FIG. 3 is a structure diagram of a depth detection network model provided by an embodiment of the present disclosure.

FIG. 3 illustrates a structure diagram of the depth detection network model provided in embodiments of the present disclosure. The structure of the depth convolution module is illustrated by including four depth separable convolution units. The four depth separable convolution units are sequentially connected in series. The four depth separable convolution units are named as a first depth separable convolution unit, a second depth separable convolution unit, a third depth separable convolution unit and a fourth depth separable convolution unit respectively.

The number of input channels of the first depth separable convolution unit is 3 and the number of output channels is 16; the number of input channels of the second depth separable convolution unit is 16 and the number of output channels is 32; the number of input channels of the third depth separable convolution unit is 32 and the number of output channels is 64; and the number of input channels of the fourth depth separable convolution unit is 64 and the number of output channels is 128. The levels of the image features extracted by the depth separable convolution units of the depth convolution module are sequentially increased according to the serial connection sequence of the depth separable convolution units. The image feature information extracted by the first depth separable convolution unit is the feature at the lowest level in the four depth separable convolution units, and the image feature information extracted by the fourth depth separable convolution unit is the image feature at the highest level in the four depth separable convolution units.

Still as shown in FIG. 3, the feature fusion module corresponding to the depth convolution module includes three second fusion convolution units sequentially connected in series. The three second fusion convolution units are named as a first second fusion convolution unit, a second second fusion convolution unit and a third second fusion convolution unit. The number of input channels of the first second fusion convolution unit is 128 and the number of output channels is 64; the number of input channels of the second second fusion convolution unit is 64 and the number of output channels is 32; and the number of input channels of the third second fusion convolution unit is 32 and the number of output channels is 16.

Features extracted by the fourth depth separable convolution unit can be input to the first second fusion convolution unit to obtain a first output result. The first output result and features extracted by the third depth separable convolution unit are fused to obtain a second output result. The second output result and features extracted by the second depth separable convolution unit are fused to obtain a fused feature. The obtained fused feature is input into the depth prediction module to obtain the depth distribution feature map with one channel. The number of input channels of the depth prediction module is 16 and the number of output channels is 1. The depth distribution feature map with one channel can be output through the depth prediction module.

In some embodiments, the depth distribution value of each pixel point is represented through a thermodynamic diagram. The depth value corresponding to the pixel point of the image in a region with the redder color in the thermodynamic diagram is larger, and the depth value corresponding to the pixel point of the image in a region with the bluer color in the thermodynamic diagram is smaller.

Figure 4:
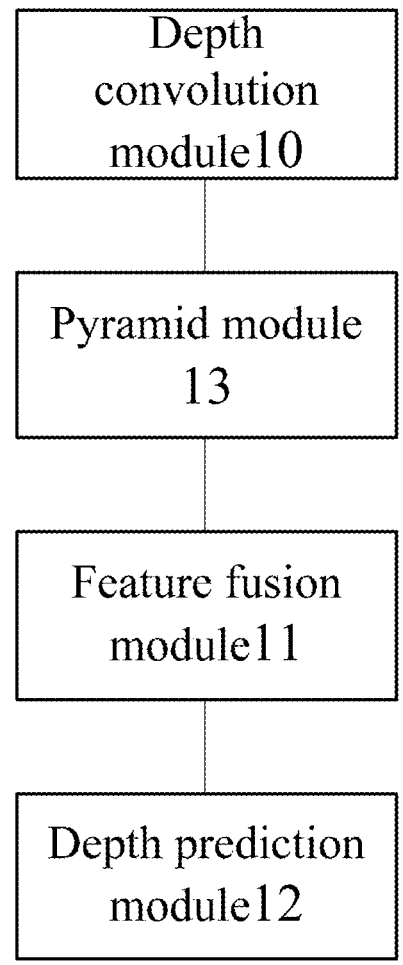
FIG. 4 is a structure diagram of the depth detection network model provided by the embodiment of the present disclosure.

In some embodiments, in order to further improve the accuracy of depth prediction in the present disclosure, another depth detection network model is provided, as shown in FIG. 4. The depth detection network model includes the depth convolution module 10, the feature fusion module 11 and the depth prediction module 12, and a pyramid module 13.

The depth convolution module 10 inputs the obtained image features at the highest level to the pyramid module 13. The pyramid module 13 processes the input image features at the highest level through convolution kernels in multiple sizes to obtain a super-high-level image feature. The feature fusion module 11 is configured to fuse the super-high-level image feature output by the pyramid module 13 and the image features with different levels input by the depth convolution module 10 to obtain the fused feature.

Based on the network model provided in the embodiments of the present disclosure, the image features at a higher level in the image can be extracted by adding the pyramid module, and the accuracy of the obtained depth feature distribution map is higher.

In some embodiments, the pyramid module includes at least two parallel connection convolution units and a first fusion convolution unit. After the at least two parallel connection convolution units are connected in parallel, one ends of the at least two parallel connection convolution units are connected with the first fusion convolution unit in series, and the other ends of the at least two parallel connection convolution units are connected with the depth convolution module.

The input information of each parallel convolution unit is the image feature at the highest level output by the depth convolution module. Each parallel convolution unit performs convolution processing on the input information through the convolution kernels in multiple sizes to obtain a processing result, and the processing result is input to the first fusion convolution unit. Convolution kernels adopted by the different parallel convolution units are different in size; moreover, the number of input channels and the number of output channels of each parallel convolution unit are the same; and the first fusion convolution unit is configured to perform feature fusion on the processing result of each parallel convolution unit to obtain the super-high-level image feature.

The pyramid module can acquire the corresponding position relation of each pixel receptive field in the image by adopting the convolution kernels with different scales, and can acquire the super-high-level image feature of the image, so that the prediction accuracy of the network model on the depth feature distribution map is further improved.

In some embodiments, after the pyramid module is added in the depth detection network model, the feature fusion module corresponding to the pyramid module includes the at least two second fusion convolution units which are sequentially connected in series. The total number of the second fusion convolution units is smaller than or equal to the total number of the levels of image features output by the depth convolution module. The number of input channels of each second fusion convolution unit is larger than the number of output channels. The number of the output channels of each second fusion convolution unit is sequentially reduced according to the serial connection sequence of the second fusion convolution units.

The first second fusion convolution unit is configured to perform feature fusion on the super-high-level image feature output by the pyramid module and the image feature at the highest level output by the depth convolution module, and the processing result is input to the next second fusion convolution unit.

Each second fusion convolution unit except the first second fusion convolution unit is configured to perform feature fusion on the input information, the input information includes the processing result of the previous second fusion convolution unit and the image feature at the corresponding level output by the depth convolution module. The levels of the image features input to the second fusion convolution unit by the depth convolution module are sequentially reduced according to the serial connection sequence of the second fusion convolution units.

The image features extracted by the depth convolution module and the pyramid module can be fused by applying the feature fusion module, thus the high-level features and the low-level features of the image are considered, and the resolution of the image is gradually recovered.

3. Depth Prediction Module 12.

In some embodiments, as previously described with respect to FIG. 3, the fused feature input to the depth prediction module has at least two channels, and the depth prediction module is configured to process the at least two channels of the fused feature to obtain the depth distribution feature map with one channel.

The depth prediction module can calculate the depth value corresponding to each pixel point by fusing fused features of the at least two channels to obtain the depth feature distribution map.

In some embodiments, the structures of the parallel convolution unit, the first fusion convolution unit and the second fusion convolution unit described above can all be depth separable convolution structures. The depth separable structures can reduce the calculating amount when the depth detection network model extract image feature, to thereby improve the calculating efficiency.

Figure 5:
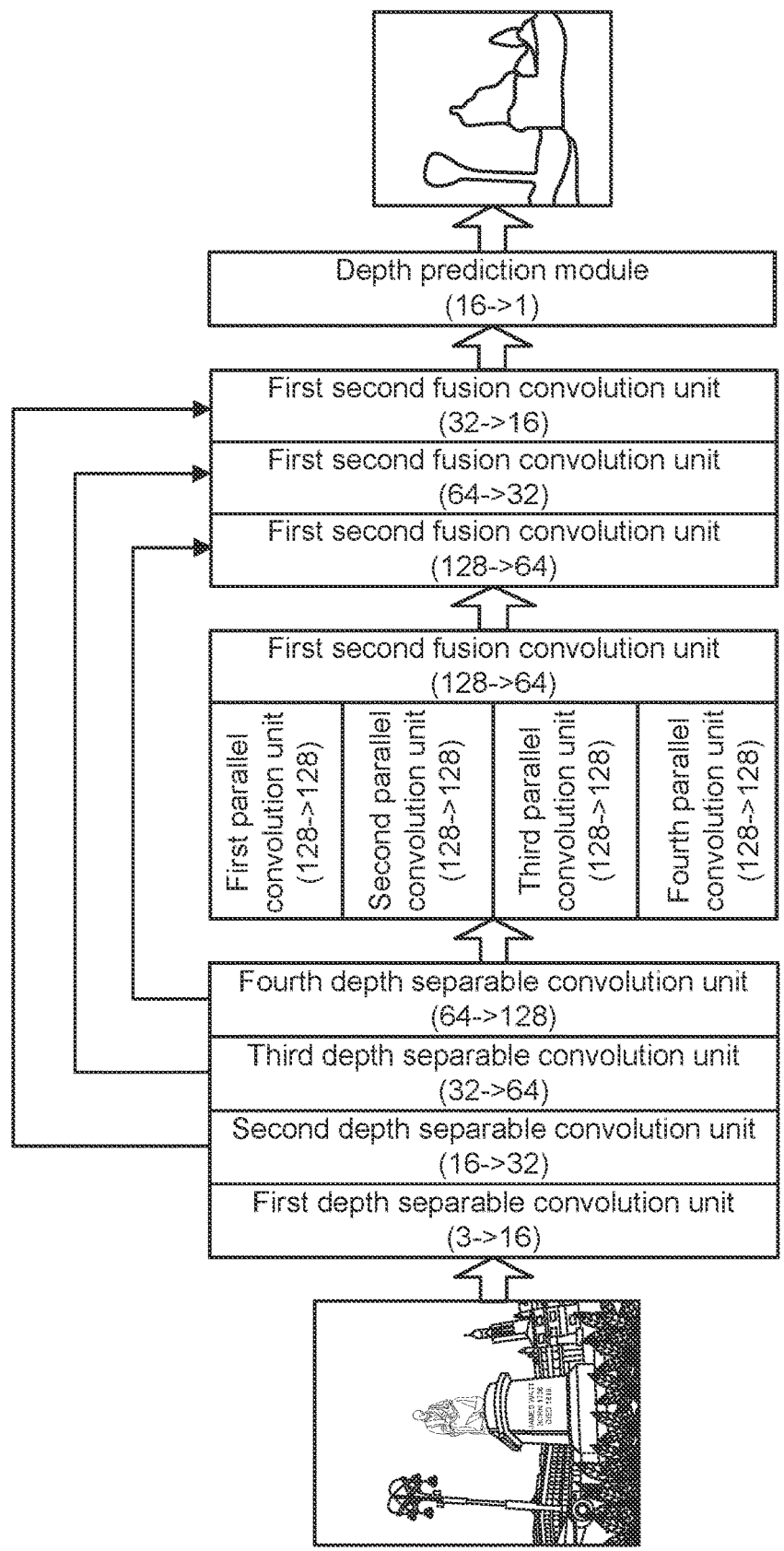
FIG. 5 is a structure diagram of the depth detection network model provided by the embodiment of the present disclosure.

FIG. 5 illustrates an application diagram of the depth detection network model provided by the present disclosure. The structure of the depth convolution module is illustrated by including four depth separable convolution units which are sequentially connected in series. The first depth separable convolution unit has 3 input channels and 16 output channels, the second depth separable convolution unit has 16 input channels and 32 output channels, the third depth separable convolution unit has 32 input channels and 64 output channels, and the fourth depth separable convolution unit has 64 input channels and 128 output channels.

The levels of the image features extracted by the depth separable convolution units of the depth convolution module are sequentially increased according to the connection sequence of the depth separable convolution units. The image feature information extracted by the first depth separable convolution unit is the feature at the lowest level in the four depth separable convolution units, and the image feature information extracted by the fourth depth separable convolution unit is a feature at the highest level in the four depth separable convolution units.

The pyramid module includes four parallel convolution units. The number of input channels and the number of output channels of the four parallel convolution units are both 128. The convolution kernels of the four parallel convolution units are different and multiply in order from top to bottom.

In some embodiments, the convolution kernel of the first parallel convolution unit is 1*1, the convolution kernel of the second parallel convolution unit is 2*2, the convolution kernel of the third parallel convolution unit is 4*4, and the convolution kernel of the fourth parallel convolution unit is 8*8. By adopting the convolution kernels with different scales, the relative relation of the receptive field of each pixel point on the original image on the whole image can be obtained. The image features extracted by the four parallel convolution units are input into the first fusion convolution unit for feature fusion. The number of input channels of the first fusion convolution unit is 512 and the number of output channels is 128, when the first fusion convolution unit carries out feature fusion, the image features output from the parallel convolution units are subjected to up-sampling so as to improve the resolution of the image, and then feature fusion is executed.

In some embodiments, the structure of the feature fusion module is illustrated by including three second fusion convolution units connected in series. The number of input channels of the first second fusion convolution unit is 128 and the number of output channels is 64, the number of input channels of the second second fusion convolution unit is 64 and the number of output channels is 32, and the number of input channels of the third second fusion convolution unit is 32 and the number of output channels is 16. The super-high feature output by the first fusion convolution unit and the feature at the highest level in the fourth depth separable convolution unit are input into the first second fusion convolution unit for feature fusion to obtain a first result. Then the obtained first result and the feature in the third depth separable convolution unit are subjected to feature fusion to obtain a second result. And finally, the second result and the feature in the second depth separable convolution unit are subjected to feature fusion to obtain the fused feature.

The obtained fused feature is input into the depth prediction module to obtain the depth distribution feature map with one channel. The number of input channels of the depth prediction module is 16 and the number of output channels is 1.

Through constructing the depth detection network module by the above mode, the training samples are required to be input into the network model for training, and model parameters of the network model are adjusted according to a training result, so that an appropriate model for predicting a monocular depth is obtained.

In some embodiments, after the training samples are input into the network model, the depth feature distribution map predicted by the network model can be obtained, and a certain difference may exist between the depth feature distribution map predicted by the network model and a feature distribution map in the training sample label, so that parameters in the network model need to be adjusted.

The network model is trained through a comprehensive loss quantity obtained by adopting at least two loss functions, wherein the at least two loss functions are respectively configured to calculate loss components between the depth distribution feature map of the training samples detected by the depth detection model and the label of the training samples; the comprehensive loss quantity is obtained by weighting and summing all the loss components; and the at least two loss functions include at least two of the following functions: a reversed HuBer function, a gradient loss function in a first coordinate axis direction and a second coordinate axis direction and a loss function of a pixel normal vector, wherein the first coordinate axis direction is perpendicular to the second coordinate axis direction.

The reversed HuBer is good at learning the complex training samples with more image features, the gradient loss function in the first coordinate axis direction and the second coordinate axis direction is good at learning the features of a vertical edge of the image, the loss function of the pixel normal vector is good at learning the simple training samples with less image features, learning of the difficult samples and the simple samples can be considered through application of the plurality of loss functions, and the learning efficiency of the network model is improved.

In some embodiments, the parameters of the network model can be optimized through a random gradient descent method to obtain the trained network model, then the network model is verified through a verification sample, and a prediction result of the network model is evaluated through an average relative error and a root mean square error to obtain the predicted accuracy of the network model.

Figure 6:
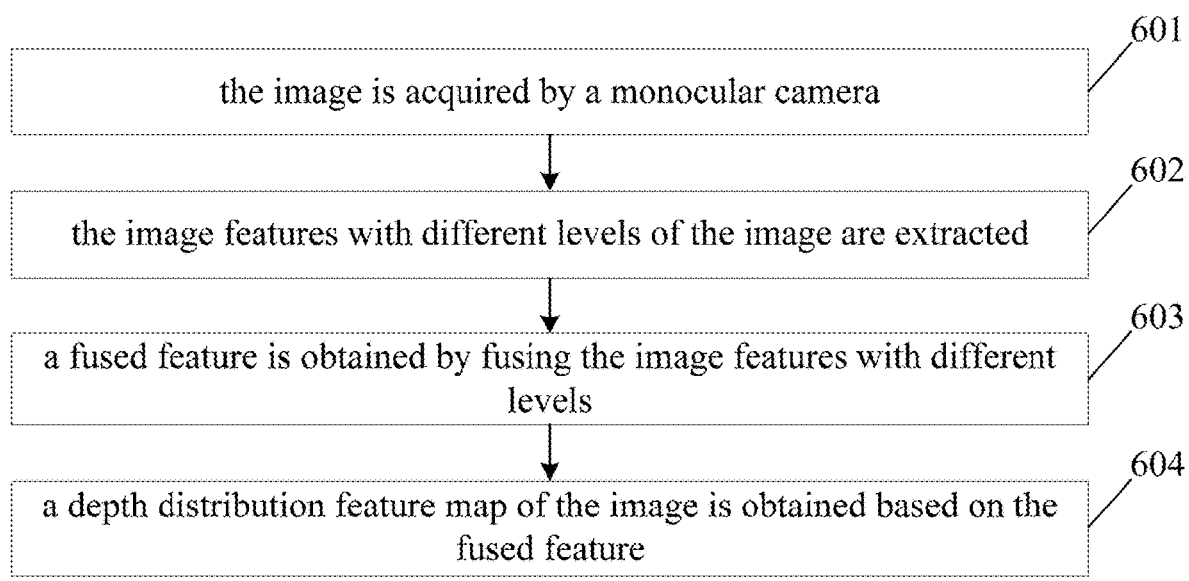
FIG. 6 is a flow diagram of a method for processing an image provided by an embodiment of the present disclosure.

In some embodiments, after the depth detection network model is obtained, image processing can be performed through the network model. FIG. 6 illustrates a flow chart of a method for processing an image provided by the present disclosure. The method includes the following steps.

Step 601: the image is acquired by a monocular camera.

Step 602: the image features with different levels of the image are extracted.

Step 603: a fused feature is obtained by fusing the image features with different levels.

In some embodiments, prior to step 603, a super-high-level image feature is obtained by processing the image feature at the highest level in the image features with different levels through the convolution kernels in multiple sizes.

After the super-high-level image feature is obtained, step 603 may be executed as follows: the image features with different levels and the super-high-level image feature are fused to obtain the fused feature.

Specifically, step 603 can be implemented as follows: the feature fusion operations are sequentially executed according to the levels of the image features from high to low, and the numbers of output channels of the processing results after the feature fusion operations are executed are sequentially reduced, where when the feature fusion operation is executed for the first time, feature fusion is executed on the super-high-level image feature and the image feature at the highest level to obtain the processing result; aiming at each feature fusion operation except the feature fusion operation executed for the first time, the input information of each feature fusion operation is the processing result of the previous feature fusion operation and the image feature at the corresponding level; where the times of the feature fusion operations are less than or equal to the total number of the levels of the image features with different levels; and the resolution of the processing result of the last feature fusion operation is the same as the resolution of the image.

Referring to FIG. 5, the first feature fusion operation is the super-high-level image feature output by the first convolution module and the image feature at the highest level in the fourth depth separable convolution unit, and then each feature fusion operation can be executed with reference to FIG. 5.

Through the mode, the image feature at the higher level of the image can be extracted, so that the extracted depth distribution feature map is more real.

Step 604: a depth distribution feature map of the image is obtained by processing the fused feature. A pixel value of each pixel point in the depth distribution feature map is a depth value.

In some embodiments, the fused feature has the at least two channels, the image features with different levels and the super-high-level image feature are fused to obtain the fused feature, and the at least two channels of the fused feature can be processed to obtain the depth distribution feature map with one channel (for example, the thermodynamic diagram/gray-scale map as described above).

Figure 7:
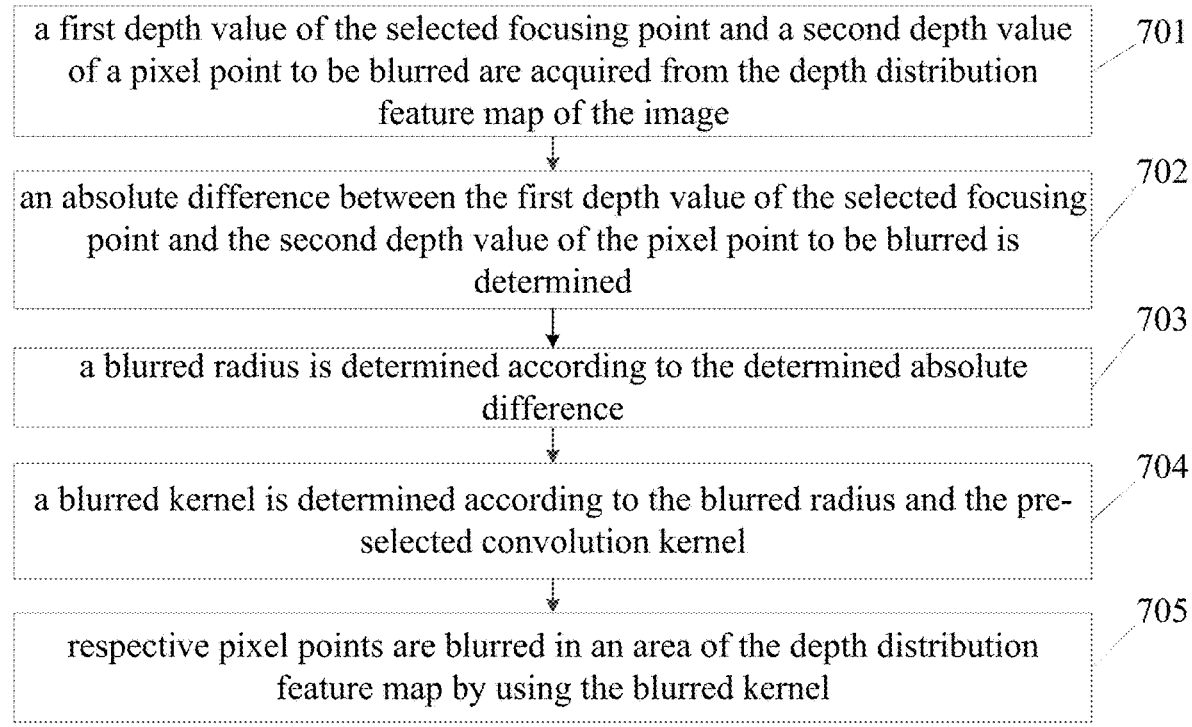
FIG. 7 is a schematic flow diagram of a method for blurring processing provided by an embodiment of the present disclosure.

In some embodiments, one particular application for obtaining the depth of the image may carry out blurring processing on the image. The present disclosure also provides a specific blurring processing method. After the depth distribution feature map of the image is obtained, as shown in FIG. 7, the image processing method provided by the present disclosure can further include the following steps.

Step 701: a first depth value of the selected focusing point and a second depth value of a pixel point to be blurred are acquired from the depth distribution feature map of the image.

Step 702: an absolute difference between the first depth value of the selected focusing point and the second depth value of the pixel point to be blurred is determined.

Step 703: a blurred radius is determined according to the determined absolute difference.

The blurred radius is positively correlated with the absolute difference. That is, the larger the absolute difference, the larger the blurred radius; and the smaller the absolute difference, the smaller the blurred radius.

Step 704: a blurred kernel is determined according to the blurred radius and the pre-selected convolution kernel. The convolution kernels for selection are in at least two shapes.

In some embodiments, the convolution kernels can be in at least two of the following shapes: heart shape, pentagram, circle, pentagon, butterfly shape and the like. In specific implementation, other geometries may be determined according to actual requirements and are suitable for use in the embodiments of the present disclosure.

The present disclosure provides a plurality of shapes of the convolution kernels, a user can select the appropriate shapes of the convolution kernels according to needs to carry out blurring on images of different scenes, and the experience degree of the user is improved.

Step 705: respective pixel points are blurred in an area of the depth distribution feature map by using the blurred kernel. The area is an area with the pixel point to be blurred as a reference and the blurred radius as a radius.

Specifically, after the user selects a focusing point A of the image by clicking a screen, coordinates (X0, Y0) of the focusing point A are obtained, the depth feature distribution map of the image is obtained according to the depth network detection model, a depth value Z0 of the focusing point A is obtained, then a depth value Zi of the pixel point to be blurred is obtained, and the absolute difference between the depth value of the focusing point and the depth value of the pixel point to be blurred is calculated. The blurred radius is determined according to the determined absolute difference.

The user may select the plurality of convolution kernels, and each convolution kernel corresponds to one template. The size of each template is not necessarily consistent with the blurred radius, so after the blurred radius and the convolution kernels are determined, the convolution kernels can be scaled to the size of the blurred radius to obtain the blur kernel, and finally, for each pixel point in the blurred radius taking the pixel point to be blurred as the reference, the blur kernel is adopted to carry out blurring processing. If the selected blur kernel is butterfly-shaped, an image with a butterfly-shaped blurring effect can be obtained, and if the selected blur kernel is heart-shaped and circular, a blurred image with both heart-shaped and circular light spot effects can be obtained.

Figure 8:
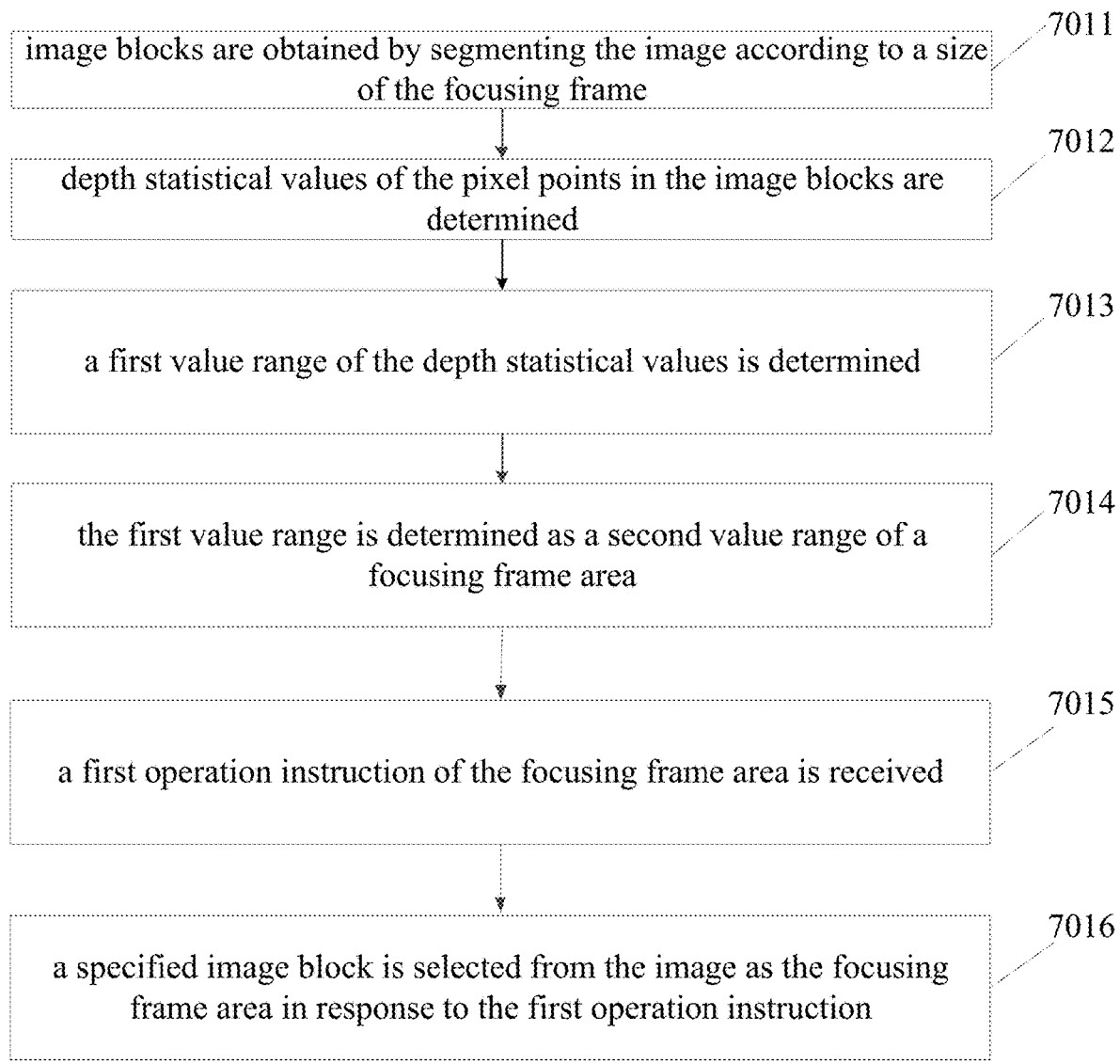
FIG. 8 is a flow diagram for determining a selected focusing point provided by an embodiment of the present disclosure.

In order to implement the images with the different effects, embodiments of the present disclosure may provide an operation interface as shown in FIG. 8. The operation interface may include at least one of the following function items: a focus adjusting function item which is configured to adjust the position of the focusing point; a correction function item which is configured to adjust the size of the blurred radius; and a focus size adjusting item which is configured to adjust the size of the focusing frame.

1. Aiming at the Focus Adjusting Function Item.

A position of the focusing point is represented by a focusing area, and determination of the selected focusing point in step 701 can include the following steps as shown in FIG. 8.

Step 7011: image blocks are obtained by segmenting the image according to a size of the focusing frame.

Step 7012: depth statistical values of the pixel points in the image blocks are determined.

Figure 9:
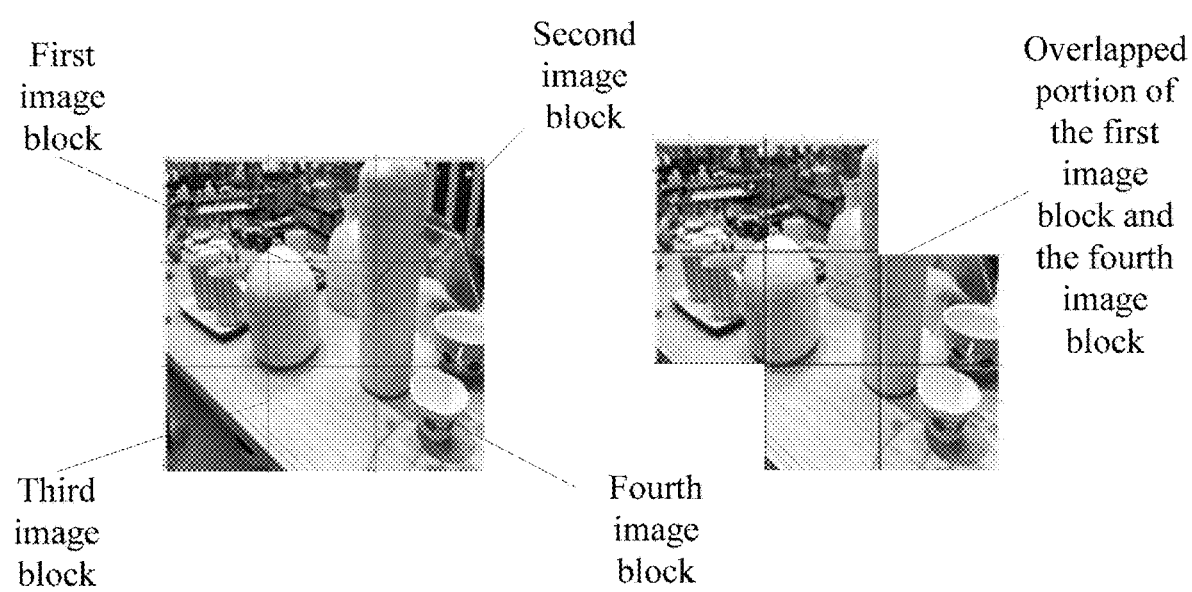
FIG. 9 is a schematic diagram of an image block provided by an embodiment of the present disclosure.

It is to be explained that the image is segmented according to the size of the focusing frame in the order from left to right and from top to bottom to obtain the image blocks, so that the image blocks may be partially overlapped. As shown in FIG. 9, the image is segmented into the 9 small image blocks with the specification of 3*3, every 4 adjacent small image blocks form a large image block, and the four large image blocks are obtained totally and are a first image block, a second image block, a third image block and a fourth image block respectively, wherein one small image block in the first image block and one small image block in the fourth image block are overlapped.

Step 7013: a first value range of the depth statistical values is determined.

Step 7014: the first value range is determined as a second value range of a focusing frame area.

It should be noted that in the value range of the depth statistical values, the minimum value in the depth statistical values is the depth minimum value in the depth average value of each pixel point in each image block, and the maximum value of the depth statistical values is the depth maximum value in the depth average value of each pixel point in each image block.

In some embodiments, the average depth value in each image block is normalized to obtain the value range from 0 to 1 of the depth statistical values. 0 corresponds to the minimum value of the average depth of the image blocks and 1 corresponds to the maximum value of the average depth of the image blocks.

Step 7015: a first operation instruction of the focusing frame area is received. The first operation instruction includes values of the focusing frame area.

Step 7016: a specified image block is selected from the image as the focusing frame area in response to the first operation instruction. The depth statistical values of the pixel points in the specified image block are the values of the focusing frame area included in the first operation instruction.

In some embodiments, the focusing area can be selected by dragging the focusing frame or by sliding a focus slider before image blurring is performed, and if a shot image has been obtained, the focusing area can be selected again by sliding the focus slider.

Figure 10:
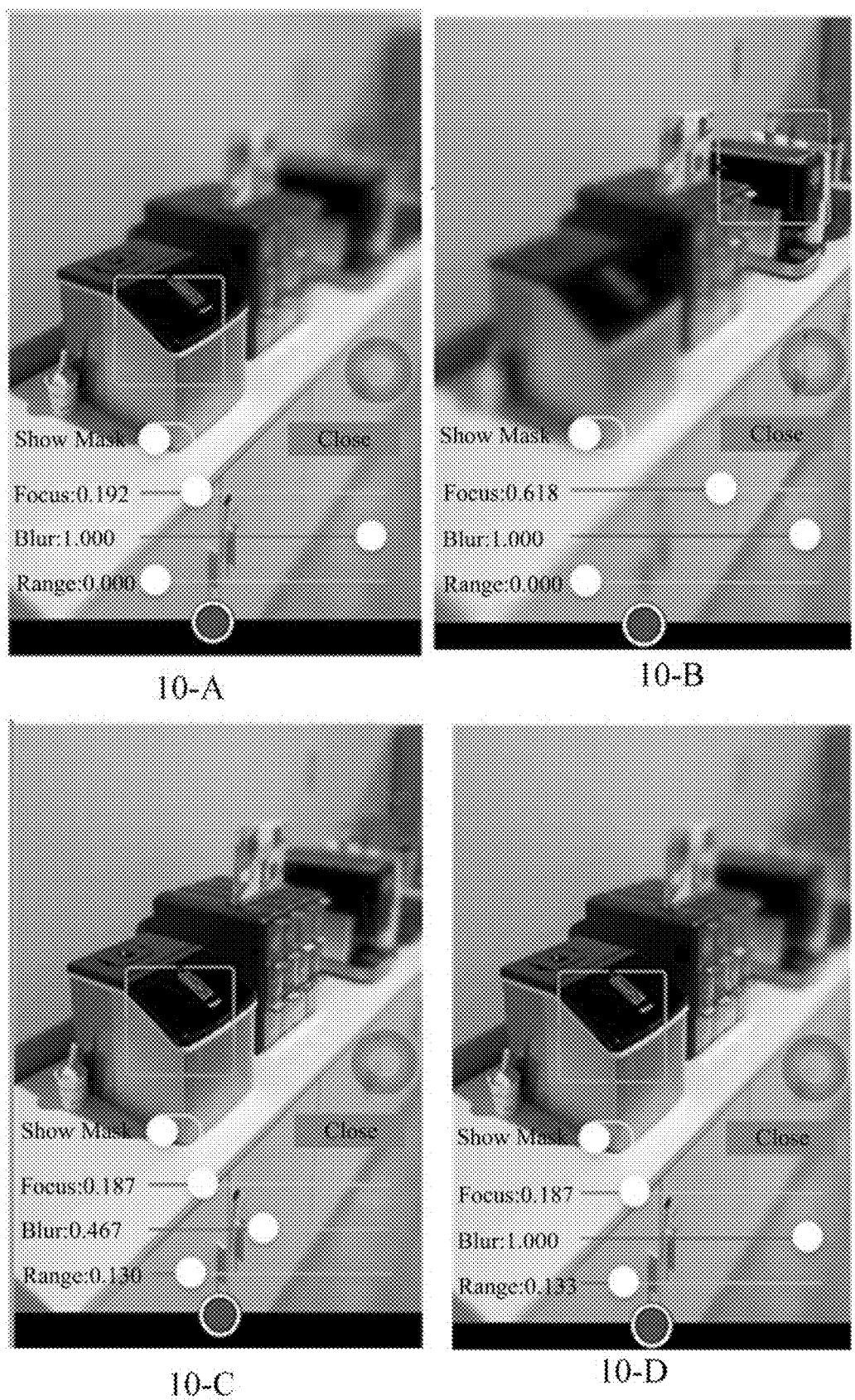
FIG. 10 is a schematic diagram of an interface for image blurring provided by an embodiment of the present disclosure.

An image blurring interface provided by the present disclosure is shown in FIG. 10, wherein Focus and a box in a picture represent a focusing range, and Focus represents a focus adjusting function item which corresponds to the first operation instruction and has a value range of 0-1. During operation of the user, the focusing position can be adjusted by dragging the box or sliding a sliding rod, and the value of Focus changes along with change of the focusing position.

2. Aiming at the correction function item.

Before the step of determining the blurred kernel according to the blurred radius and the pre-selected convolution kernel, the method further includes the following steps: a second operation instruction for the blurred radius is received, where the second operation instruction includes an aperture value; and a product of the aperture value and the determined blurred radius is determined as a final blurred radius.

In some embodiments, the value range of the correction function item of the blurred radius may be 0-1. In the value section, the blurred radius will be reduced in different proportions. When the value is 1, the blurred radius is not reduced, and when the value is 0, it is equivalent to not blurring the image.

By adjusting the blurred radius, the blurring effect can be adjusted in the dimension of the blurred radius, so that the user can conveniently observe the blurring effect and select a favorite effect.

As shown in FIG. 10, Blur represents the correction function item in which the aperture value represents the blurred radius, and corresponds to the second operation instruction, the value range of Blur is 0-1, the larger the value, the larger the aperture value, the larger the aperture, the shallower the depth of field, and the more blur the background.

3. Aiming at the focus size adjusting item.

A third operation instruction aiming at a focusing frame size adjusting item is received, and the size of the focusing frame is determined.

Range in FIG. 10 represents the focusing frame size adjustment item which corresponds to the third operation instruction, the value range is 0-1, the larger the value, the larger the focusing frame, and the larger the clear range. According to the depth of the image, by the user, a corresponding large aperture graph can be formed on a target area to be focused, and as shown in FIG. 10-A and FIG. 10-B, an effect of blurring the focusing frame for the different depth statistical values is formed due to difference of the focusing points.

After the focusing position is determined, the user can adjust the aperture value to form pictures with different effects of depth of field, as shown in FIG. 10-A and FIG. 10-C.

After the position of the focusing frame is determined, the user can also adjust Range to form pictures with different clear ranges, as shown in FIG. 10-A and FIG. 10-D.

Show Mask is started and closed corresponding to an image blurring interactive interface.

Figure 11:
FIG. 11 is a schematic diagram of an image blurring effect provided by an embodiment of the present disclosure.
Figure 11:
Figure 11:

Referring to FIG. 11, a blurring effect diagram obtained by the depth distribution feature map is shown, where FIG. 11-A is an interface diagram of the convolution kernels for selection, FIG. 11-B is a blurring effect diagram of heart-shaped light spots obtained by the heart-shaped convolution kernels, and FIG. 11-C is a blurring effect diagram of butterfly-shaped light spots obtained by the butterfly-shaped convolution kernels. When the depth of the pixel point to be blurred is farther away from the focusing depth, the blurring effect is more obvious, the light spot effect is larger, the pixel point is brighter, the light spot effect is more obvious, and the artistic effect of the picture is stronger.

Figure 12:
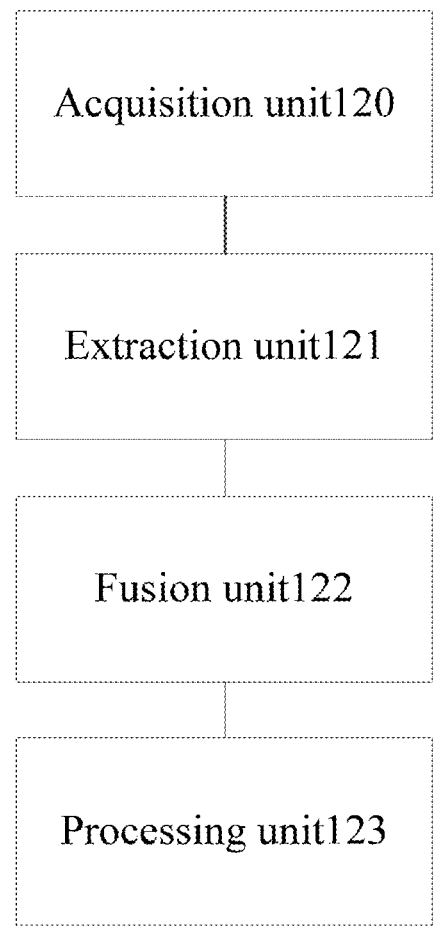
FIG. 12 is a structure diagram of a device for processing an image provided by an embodiment of the present disclosure.
Figure 13:
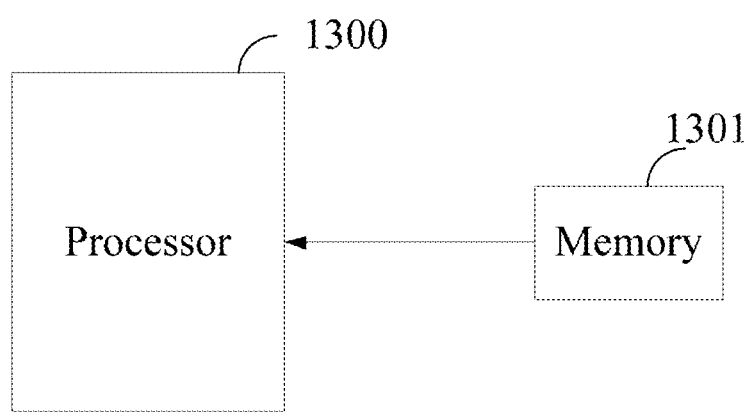
FIG. 13 is a structure diagram of electronic equipment provided by an embodiment of the present disclosure.

FIG. 12 shows a schematic diagram of a device for processing an image according to some embodiments of the present disclosure. The device includes an acquisition unit 120, an extraction unit 121, a fusion unit 122 and a processing unit 123.

The acquisition unit 120 is configured to acquire an image by a monocular camera.

The extraction unit 121 is configured to extract the image features with different levels of the image.

The fusion unit 122 is configured to obtain a fused feature by fusing the image features with different levels.

The processing unit 123 is configured to obtain a depth distribution feature map of the image based on the fused feature. The pixel value of each pixel point in the depth distribution feature map is the depth value.

In some embodiments, the device further includes: a pyramid unit.

The pyramid unit is configured to obtain a super-high-level image feature by convoluting the image feature at the highest level through convolution kernels in multiple sizes.

The fusion unit 122 is configured to: fuse the image features with different levels and the super-high-level image feature to obtain the fused feature.

In some embodiments, the fusion unit 122 is configured to: sequentially execute the feature fusion operations according to the levels of the image features from highest to lowest, and sequentially reduce the numbers of the output channels of the processing results after the feature fusion operations are executed. When the feature fusion operation is executed for the first time, feature fusion is executed on the super-high-level image feature and the image feature at the highest level to obtain the processing result.

For each feature fusion operation except the feature fusion operation executed for the first time, the input information of each feature fusion operation is the processing result of the previous feature fusion operation and the image feature at the corresponding level.

The times of the feature fusion operations are less than or equal to the total number of levels of the image features with different levels; and the resolution of the processing result of the last feature fusion operation is the same as the resolution of the image.

In some embodiments, the fused feature has the at least two channels, and the fusion unit 122 is configured to: obtain the depth distribution feature map with one channel by processing the at least two channels of the fused feature.

In some embodiments, the device further includes: a blur unit, configured to acquire a first depth value of a selected focusing point and a second depth value of a pixel point to be blurred of the depth distribution feature map of the image after the processing unit 123 processes the fused feature to obtain the depth distribution feature map of the image; determine an absolute difference between the first depth value of the selected focusing point and the second depth value of the pixel point to be blurred; determine a blurred radius based on the absolute difference, where the blurred radius is positively correlated with the absolute difference; determine a blurred kernel according to the blurred radius and a pre-selected convolution kernel, where convolution kernels for selection are in at least two shapes; and blur respective pixel points in an area of the depth distribution feature map by using the blurred kernel, where the area is an area with the pixel point to be blurred as a reference and the blurred radius as a radius.

In some embodiments, the position of the focusing point is represented by the focusing frame area, and the device further includes: a focusing point selection unit, configured to obtain the image blocks by segmenting the image according to the size of a focusing frame, and determine the depth statistical values of the pixel points in the image blocks; determine a first value range of the depth statistical values; determine the first value range as a second value range of a focusing frame area; receive a first operation instruction of the focusing frame area, wherein the first operation instruction comprises values of the focusing frame area; and select a specified image block from the image as the focusing frame area in response to the first operation instruction, wherein the focusing frame area represents a position of the selected focusing point, the depth statistical values of the pixel points in the specified image block are the values of the focusing frame area comprised in the first operation instruction.

In some embodiments, the device further includes: a blurred radius determination unit, configured to receive a second operation instruction for the blurred radius, where the second operation instruction includes an aperture value; and determine a product of the aperture value and the determined blurred radius as the final blurred radius.

After an intelligent terminal control method and device in the exemplary embodiments of the present disclosure are introduced, electronic equipment in another exemplary embodiment of the present disclosure is introduced. As will be appreciated by one skilled in the art, aspects of the present disclosure may be embodied as a system, method or program product. Accordingly, various aspects of the present disclosure may be embodied in the form of: an entirely hardware embodiment, an entirely software embodiment (including firmware, microcode and the like), or an embodiment combining hardware and software aspects that may all generally be referred to herein as a 'circuit', 'module' or 'system'.

In some possible embodiments, the electronic equipment according to the present disclosure may include: a processor 1300; and a memory 1301 for storing instructions executable by the processor 1300.

The processor 1301 is configured to execute the instructions, so that the processor performs the steps in the image processing method according to various exemplary embodiments of the present disclosure described above in the specification. For example, the processor may perform steps 601-604 as shown in FIG. 6.

The present disclosure provides a computer storage medium, a computer program is stored on the computer storage medium, and the program is executed by the processor to: acquire an image via a monocular camera; extract image features with different levels of the image; determine a fused feature by fusing the image features; and determine a depth distribution feature map of the image by processing the fused feature.

Other embodiments of the present disclosure will be apparent to those skilled in the art from consideration of the specification and practice of the disclosure disclosed herein. This application is intended to cover any variations, uses, or adaptations of the present disclosure following the general principles of the present disclosure and including common general knowledge or customary technical means in the art not disclosed in the present disclosure. It is intended that the specification and examples are considered as exemplary only, and a true scope and spirit of the present disclosure are indicated by the following claims.

It will be understood that the present disclosure is not limited to the precise structures that have been described above and shown in the drawings, and that various modifications and changes may be made without departing from the scope thereof. The scope of the present disclosure is limited only by the appended claims.

What is claimed is:

1. A method for processing an image, comprising:
obtaining an it by a monocular camera;
extracting image features with different levels based on the image;
determining a fused feature by fusing the image features with different levels; and
determining a depth distribution feature map of the image based on the fused feature, wherein a pixel value of each pixel point in the depth distribution feature map is a depth value;
obtaining a first depth value of a selected focusing point and a second depth value of a pixel point to be blurred of the depth distribution feature map;
determining an absolute difference between the first depth value and the second depth value;
determining a blurred radius based on the absolute difference, wherein the blurred radius is positively correlated with the absolute difference;
determining a blurred kernel based on the blurred radius and a pre-selected convolution kernel; and
blurring respective pixel points in an area of the depth distribution feature map based on the blurred kernel, wherein the area is an area with the pixel point to be blurred as a reference and the blurred radius as a radius;
wherein acquiring the selected focusing point comprises:
obtaining image blocks by segmenting the image based on a size of a focusing frame;
determining depth statistical values of pixel points of each image block;
determining a first value range of a focusing frame area based on the depth statistical values; receiving a first operation instruction of the focusing frame area, wherein the first operation instruction comprises values of the focusing frame area; and
selecting a specified image block as the focusing frame area based on the first operation instruction, wherein the depth statistical values in the specified image block are equal to the values of the focusing frame area in the first operation instruction, and the focusing frame area represents a position of the selected focusing point.

2. The method according to claim 1, wherein said determining the fused feature comprises:
determining a super-high-level image feature by convoluting the image feature with a highest level through convolution kernels in multiple sizes; and
determining the fused feature by fusing the image features and the super-high-level image feature.

3. The method according to claim 2, wherein said determining the fused feature by fusing the image features and the super-high-level image feature comprises:
fusing the image features in order of levels of the image features from highest to lowest;
wherein fusing the super-high-level image feature and the image feature with the highest level firstly; and
wherein fusing the image features based on a result of the previous said fusing the image features, and the image feature with a corresponding level;
wherein times of said fusing the image features are smaller than or equal to a total number of the different levels, and a resolution of the fused feature is the same as a resolution of the image.

4. The method according to claim 2, further comprising:
determining the depth distribution feature map with one channel based on the fused feature, wherein the fused feature comprises at least two channels.

5. The method according to claim 1, wherein said determining the blurred radius further comprises:
receiving a second operation instruction for the blurred radius, wherein the second operation instruction comprises an aperture value; and
determining the blurred radius based on the aperture value and the determined blurred radius.

6. The method according to claim 1, wherein convolution kernels are in at least two of the following shapes: heart shape, pentagram, circle, pentagon, and butterfly shape.

7. A device for processing an image, comprising: a memory and at least one processor, wherein the at least one processor is configured to read and execute instructions stored in the memory to:
obtain an image by a monocular camera;
extract image features with different levels based on the image;
determine a fused feature by fusing the image features with different levels;
and determine a depth distribution feature map of the image based on the fused feature, wherein a pixel value of each pixel point in the depth distribution feature map is a depth value;
obtain a first depth value of a selected focusing point and a second depth value of a pixel point to be blurred of the depth distribution feature map;
determine an absolute difference between the first depth value and the second depth value;
determine a blurred radius based on the absolute difference, wherein the blurred radius is positively correlated with the absolute difference;
determine a blurred kernel based on the blurred radius and a pre-selected convolution kernel; and
blur respective pixel points in an area of the depth distribution feature map based on the blurred kernel, wherein the area is an area with the pixel point to be blurred as a reference and the blurred radius as a radius;
wherein the at least one processor is further configured to read and execute instructions stored in the memory to:
obtain image blocks by segmenting the image based on a size of a focusing frame;
determine depth statistical values of pixel points of each image block;
determine a first value range of a focusing frame area based on the depth statistical values;
receive a first operation instruction of the focusing frame area, wherein the first operation instruction comprises values of the focusing frame area; and
select a specified image block as the focusing frame area based on the first operation instruction, wherein the depth statistical values in the specified image block are equal to the values of the focusing frame area in the first operation instruction, and the focusing frame area represents a position of the selected focusing point.

8. The device according to claim 7, wherein the at least one processor is further configured to read and execute instructions stored in the memory to:
determine a super-high-level image feature by convoluting the image feature at a highest level through convolution kernels in multiple sizes; and
determine the fused feature by fusing the image features and the super-high-level image feature.

9. The device according to claim 8, wherein the at least one processor is further configured to read and execute instructions stored in the memory to:
fuse the image features in order of levels of the image features from highest to lowest;
fuse the super-high-level image feature and the image feature with the highest level firstly; and
fuse the image features based on a result of the previous said fusing the image features, and the image feature with a corresponding level;
wherein times of said fusing the image features are smaller than or equal to a total number of the different levels, and a resolution of the fused feature is the same as a resolution of the image.

10. The device according to claim 7, wherein the at least one processor is further configured to read and execute instructions stored in the memory to:
determine the depth distribution feature map with one channel based on the fused feature, wherein the fused feature comprises at least two channels.

11. The device according to claim 7, wherein the at least one processor is further configured to read and execute instructions stored in the memory to:
receive a second operation instruction for the blurred radius, wherein the second operation instruction comprises an aperture value; and
determine the blurred radius based on the aperture value and the determined blurred radius.

12. The device according to claim 7, wherein convolution kernels are in at least two of the following shapes: heart shape, pentagram, circle, pentagon, and butterfly shape.

13. A non-transitory computer storage medium, storing computer executable instructions, wherein the computer executable instructions are configured to:
obtain an image by a monocular camera;
extract image features with different levels based on the image;
determine a fused feature by fusing the image features with different levels; and
determine a depth distribution feature map of the image based on the fused feature, wherein a pixel value of each pixel point in the depth distribution feature map is a depth value;
obtain a first depth value of a selected focusing point and a second depth value of a pixel point to be blurred of the depth distribution feature map;
determine an absolute difference between the first depth value and the second depth value;
determine a blurred radius based on the absolute difference, wherein the blurred radius is positively correlated with the absolute difference;
determine a blurred kernel based on the blurred radius and a pre-selected convolution kernel; and
blur respective pixel points in an area of the depth distribution feature map based on the blurred kernel, wherein the area is an area with the pixel point to be blurred as a reference and the blurred radius as a radius;
wherein the selected focusing point is acquired by: obtaining image blocks by segmenting the image based on a size of a focusing frame,
determining depth statistical values of pixel points of each image block;
determining a first value range of a focusing frame area based on the depth statistical values; receiving a first operation instruction of the focusing frame area, wherein the first operation instruction comprises values of the focusing frame area; and
selecting a specified image block as the focusing frame area based on the first operation instruction, wherein the depth statistical values in the specified image block are equal to the values of the focusing frame area in the first operation instruction, and the focusing frame area represents a position of the selected focusing point.

* * * * *